May 20, 1924.                     1,495,010
E. H. FORD
FLUID MEASURING METER
Filed June 5, 1922
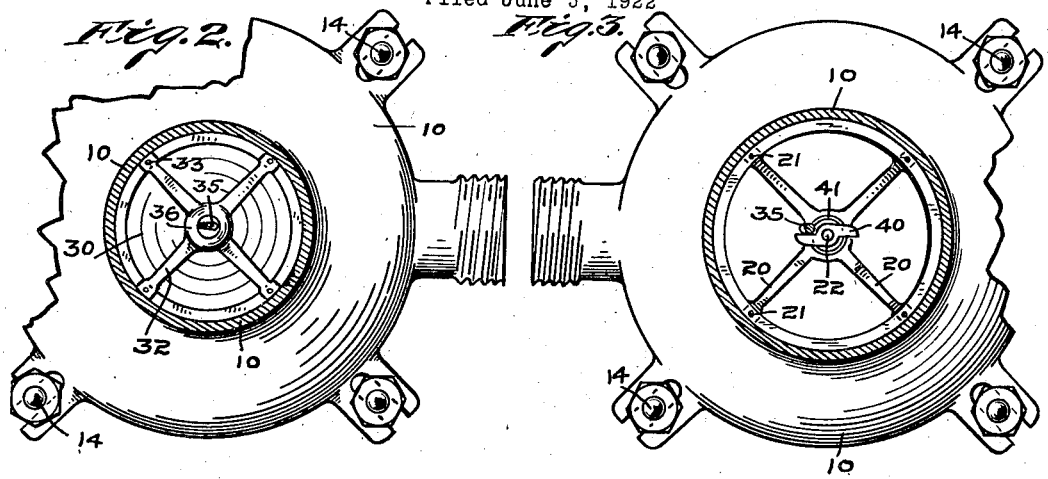
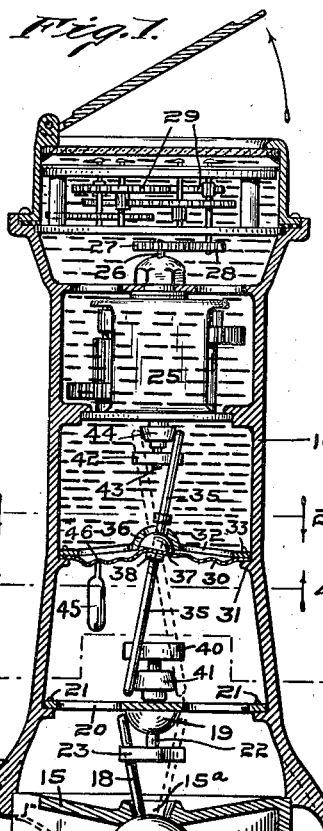
INVENTOR:
Edwin H. Ford,
By Frank W. Woerner,
ATTORNEY.

Patented May 20, 1924.

1,495,010

UNITED STATES PATENT OFFICE.

EDWIN H. FORD, OF WABASH, INDIANA.

FLUID-MEASURING METER.

Application filed June 5, 1922. Serial No. 565,913.

*To all whom it may concern:*

Be it known that I, EDWIN H. FORD, a citizen of the United States, residing at Wabash, in the county of Wabash and State of Indiana, have invented certain new and useful Improvements in Fluid-Measuring Meters, of which the following is a specification.

It has heretofore been the practice in fluid registering meter construction, such as are employed in measuring the passage of air, gases and water, to leave the speed reducing mechanism, for transmitting movement from the disk chamber to the registering mechanism, exposed to the chemical action in the fluids and the formation of fungi and other vegetable growths which tend to interfere with the normal action of the movable parts of the meter.

One of the objects of the present invention consists in the provision of means for excluding all fluids from the chamber containing the speed reducing mechanism, thereby preventing the formation of corrosion and of vegetable growths to interfere with the sensitive action of those parts which transfer motion from the fluid operated disk to the speed reducing mechanism.

Another object of the invention consists in the provision of means whereby any variation in the pressure of the fluids which has a tendency to so distort the diaphragm as to cause it to interfere with the sensitive action of the parts may be equalized in the oil holding chamber, and thus remove any such tendency to distort the diaphragm.

I accomplish the above objects of the invention, and such others as may appear from a perusal of the following description and claims, by means of the construction illustrated in the accompanying drawings, forming a part hereof, in which—

Figure 1 is a central vertical sectional view through my improved fluid meter. Fig. 2 is a horizontal section on the plane 2—2 in Fig. 1. Fig. 3 is a horizontal section on the plane 3—3 in Fig. 1. Fig. 4 is a plan view of my improved diaphragm employed in the meter, the remaining parts being omitted.

Referring to the drawings, the fluid meter comprises the usual casing 10, inlet and outlet fluid openings 11 and 12, respectively, and a removable bottom plate 13 which is held in operative position by the bolts 14. 15 is a removable disk housing which is held within casing 10 by the bottom plate 13, and 16 is a fluid operated disk which is supported by a spherical ball 17 arranged in a chamber 15$^b$ of disk housing 15, said ball having its bearings formed in the adjacent walls of housing 15. The disk 16 is oscillated on its spherical bearing 17 by the pressure of the fluid, this being common in meter construction. As shown, ball 17 is provided with a staff 18 which projects through an aperture 15$^a$ of housing 15, the said staff being arranged at right angles to the surface plane of disk 16 so that as disk 16 nutates on its bearings the free end of staff 18 will travel a prescribed circular path the radii of which will be approximately uniform at all points, and to secure a positive rest and guide for the free end of staff 18 I mount a semispherical ball 19 to the adjacent underside of a horizontally disposed spider 20, the latter being attached at several points to the inner wall of casing 10 by means of the screws 21.

Due to the limited diametrical area of casing 10, together with the angular mounting of staff 18, the effective length of the latter is necessarily limited, so that to transfer movement of rotation from staff 18 to the registering mechanism contemplates the introduction of a vertically disposed shaft 22 which is supported by a spider 20. Shaft 22 is provided at its lower end with a cross bar 23 which is contacted by the free end of staff 18 and through which movement of rotation is imparted to shaft 22.

Arranged within an intermediate portion of casing 10 is a frame 25 which forms the support for a number of intermeshing speed reducing pinions, and these pinions drive, through a shaft 26 and the pinions 27 and 28, a conventional type of fluid registering mechanism 29.

The present invention contemplates the use of certain means for excluding the fluids from the chamber containing the speed reducing mechanism, so as to remove those troubles arising through corrosion of the parts produced by the action of the chemicals in the fluids together with such vegetable growths as take place therein, said means however retaining the necessary flexibility as not to interfere with the sensitive action of the parts which transmits movement from disk 16 to the speed reducing mechanism. The above mentioned means comprises a diaphragm 30 which is preferably composed of an extremely thin sheet of copper or other suitable pliable material, and may be provided with a plurality of concentric corrugations which permit more readily temporary angular distortion without permanent injury of the diaphragm. Diaphragm 30 is shown in the form of a disk the diameter of which corresponds closely to the internal diameter of casing 10, and the outer edge of the diaphragm rests upon an annular shoulder 31 of the wall of casing 10. Arranged immediately above diaphragm 30 is a spider 32 having radial arms the free ends of which bear upon the marginal edge of the diaphragm and these arms and the diaphragm are securely attached to shoulder 31 by means of screws 33. The central portion of spider 32 forms a bearing for a nutating shaft 35, said bearing in part being formed of a semi-spherical inverted recess 36 which receives a correspondingly shaped semi-spherical ball 37 forming a support for the nutating shaft 35. The under flat surface of the semi-spherical ball 37 rests upon the upper central surface of diaphragm 30 with shaft 35 extending through a central opening therein, the semi-spherical ball and diaphragm being clamped together by means of a nut 38 on shaft 35. Mounting diaphragm 30 in the manner as above described will prevent the fluid from rising above it and thus protect the speed reducing mechanism against the collection of corrosion and vegetable growths.

Nutation is imparted to shaft 35 through a cross bar 40 secured to the vertical shaft 22, and shaft 22 is further provided with a frusto-truncated cone 41 which forms a point of bearing and guide for the lower free end of shaft 35. As shaft 22 imparts nutating movement to shaft 35 its upper end contacts and drives a cross bar 42 attached to a shaft 43 of the speed reducing mechanism. Shaft 43 is also provided with a frusto-truncated cone 44 which forms a contact and guide for the upper free end of shaft 35. By means of the foregoing construction and arrangements of parts, the diaphragm 30 may undergo free and easy bending or distortion action without imposing any perceptible restraint on the free nutation of shaft 35.

The interior of casing 10 above diaphragm 30 is completely filled with any suitable lubricating oil in which the speed reducing mechanism and registering mechanism operate, and in those cases where it is found that the varying pressure of the fluids is conducive to abnormally distort diaphragm 30 and induce friction this unequal pressure against the underside of diaphragm may be partially relieved or wholly neutralized by means of a collapsible sack 45 (Fig. 1) which is in communication with the oil chamber through an orifice 46. As the sack 45 is constantly submerged in the fluid and is more easily compressed than the amount of pressure necessary for distorting the diaphragm, any increase in pressure of the fluid will first bring about a partial collapse of sack 45 and cause it to discharge sufficient oil and so increase the pressure within the oil chamber and against the upper surface of the diaphragm to offset the tendency of such increase in pressure in the fluid chamber to distort said diaphragm 30.

Having thus fully described my said invention, what I desire to secure by Letters Patent, is—

1. In a fluid measuring meter, a casing having inlet and outlet openings, mechanism for registering the volume of fluid passing through the casing, means operated by the action of the fluid for actuating said registering mechanism, a diaphragm to divide the interior of the casing into an independent oil holding and a fluid receiving chamber, and means associated with the diaphragm for transmitting the movement developed by the fluid operated means to the registering mechanism.

2. In a fluid measuring meter, a casing having inlet and outlet openings, mechanism arranged within the casing for registering the volume of fluid passing through the casing, a speed reducing mechanism drivingly connected to the registering mechanism, means operated by the action of the fluid for actuating said speed reducing mechanism, a diaphragm to divide the interior of the casing into an independent oil holding and a fluid receiving chamber, means passing through the diaphragm to transfer the movement developed by the fluid operated means to the speed reducing mechanism, and means compressible by the pressure of the fluid for introducing an additional amount of oil into the oil chamber when the fluid pressure against the diaphragm exceeds a predetermined amount.

3. In a fluid measuring meter, a casing having inlet and outlet openings, mechanism arranged within the casing for registering the volume of fluid passing through the casing, a speed reducing mechanism drivingly engaging the registering mechanism, means operated by the action of the fluid for actuating said speed reducing mechanism, a diaphragm having a surface arranged in a determined plane for dividing the interior of the casing into an independent oil holding and fluid receiving chamber, means passing through the diaphragm to transfer the movement developed by the fluid operated means to the speed reducing mechanism, and means susceptible to partial collapse for increasing the oil pressure on the oil chamber side of the diaphragm to prevent distortion of the diaphragm through an increase in the pressure in the fluid chamber side of the diaphragm.

4. In a fluid measuring meter, a casing having inlet and outlet openings, mechanism for registering the volume of fluid passing through the casing, a speed reducing mechanism drivingly connected to said registering mechanism, means operated by the passage of the fluid through the casing, a pliable diaphragm having a plurality of corrugations for dividing the interior of the casing into an independent oil holding and fluid receiving chamber, and means passing through the diaphragm comprising a nutating shaft for transferring the movement developed by the fluid operated means to the speed reducing mechanism.

5. In a fluid measuring meter, a casing having inlet and outlet openings, mechanism for registering the volume of fluid passing through the casing, a speed reducing mechanism drivingly connected to said registering mechanism, a disk operated by the passage of the fluid through the casing, a diaphragm having a plurality of concentric corrugations for dividing the interior of the casing into an oil holding and a fluid receiving chamber, and means secured to the diaphragm comprising a nutating shaft for transferring the movement developed by the disk to the speed reducing mechanism through the pliable character of the diaphragm.

6. In a fluid measuring meter, a casing having inlet and outlet openings, mechanism for registering the volume of fluid passing through the casing, a speed reducing mechanism drivingly connected to said registering mechanism, a disk operated by the passage of the fluid through the casing, a diaphragm for dividing the interior of the casing into an oil holding and a fluid receiving chamber, means secured to the diaphragm comprising a nutating shaft for transferring the movement developed by the disk to the speed reducing mechanism through the pliable character of the diaphragm, and means for mounting and preventing longitudinal movement of the shaft.

7. In a fluid measuring meter, a casing having inlet and outlet openings, fluid registering mechanism in the casing, means operated by the flow of fluid for setting the registering mechanism into operation, means comprising a yieldable member for dividing the interior of the casing into independent oil holding and fluid receiving chambers whereby the oil and fluid are prevented from commingling, and means passing through the said chambers for operably connecting the fluid registering mechanism with the said fluid operated means, substantially as set forth.

8. In a fluid measuring meter, a casing having a passage for fluid therethrough, means operated by the flow of fluid, fluid registering mechanism for indicating the flow of fluid, means for forming independent oil and fluid chambers for the said fluid registering mechanism and the said fluid operated means respectively, means for transferring the movement developed by the said fluid operated means to the said fluid registering mechanism, and means for automatically introducing an additional amount of oil into the oil chamber when the fluid pressure exceeds a predetermined amount, substantially as set forth.

9. In a fluid measuring meter, a casing having a passage for fluid therethrough, means operated by the flow of fluid, fluid registering mechanism for indicating the flow of fluid, means for forming independent oil and fluid chambers for the said fluid registering mechanism and the said fluid operated means respectively, means for transferring the movement developed by the said fluid operated means to the said fluid registering mechanism, and means tending to balance the oil pressure against an increase in fluid pressure, substantially as set forth.

In witness whereof, I have hereunto set my hand and seal at Indianapolis, Indiana, this 29th day of May, A. D., one thousand nine hundred and twenty-two.

EDWIN H. FORD. [L. S.]